United States Patent [19]

Knödel

[11] Patent Number: 4,995,532

[45] Date of Patent: Feb. 26, 1991

[54] FLUID METERING APPARATUS FOR SUPPLYING FLUID OUT OF A STORAGE VESSEL TO A RECEIVER

[75] Inventor: Erich Knödel, Wertheim am Main, Fed. Rep. of Germany

[73] Assignee: Walter Graf u.Co. GmbH & Co., Fed. Rep. of Germany

[21] Appl. No.: 300,978

[22] Filed: Jan. 24, 1989

[30] Foreign Application Priority Data

Jan. 25, 1988 [DE] Fed. Rep. of Germany ... 8800844[U]

[51] Int. Cl.$^5$ ............................................. G01F 11/04
[52] U.S. Cl. ................................. 222/43; 73/864.18; 222/309; 222/383
[58] Field of Search ................. 73/864.18; 222/14, 23, 222/41, 44, 309, 372, 380, 383; 422/100

[56] References Cited

U.S. PATENT DOCUMENTS

| | | | |
|---|---|---|---|
| 3,283,727 | 11/1966 | Rodrigues, Jr. ................. | 222/309 X |
| 3,729,022 | 4/1973 | Roach ............................ | 222/383 X |
| 3,805,998 | 4/1974 | Croslin .......................... | 222/309 X |
| 4,072,247 | 2/1978 | Yamazaki ...................... | 222/309 X |
| 4,096,751 | 6/1978 | Withers et al. ................. | 222/43 X |
| 4,159,784 | 7/1979 | d'Autry ......................... | 222/309 X |
| 4,273,257 | 6/1981 | Smith et al. ................... | 222/43 |
| 4,306,670 | 12/1981 | Oshikubo ...................... | 222/383 X |
| 4,526,294 | 7/1985 | Hirschmann et al. .......... | 222/309 X |
| 4,671,123 | 6/1987 | Magnussen, Jr. et al. ... | 73/864.18 X |
| 4,815,632 | 3/1989 | Ball et al. ..................... | 222/383 X |

FOREIGN PATENT DOCUMENTS

| | | | |
|---|---|---|---|
| 3031830 | 3/1982 | Fed. Rep. of Germany | 222/309 |
| 3143600 | 5/1983 | Fed. Rep. of Germany | 222/43 |
| 3516596 | 10/1986 | Fed. Rep. of Germany | 222/309 |
| 253675 | 1/1988 | Fed. Rep. of Germany | 222/43 |

Primary Examiner—Kevin P. Shaver
Attorney, Agent, or Firm—Lowe, Price, LeBlanc, Becker & Shur

[57] ABSTRACT

A dispenser for precisely dispensing fluid from a storage vessel into a recipient vessel includes a housing formed with a connector portion having a valve chamber with a suction valve and a discharge valve therein. A cylinder is mounted on the connector portion. The valve chamber contains a suction valve and a discharge valve. The piston is slidably and rotatably guided in the cylinder and carries an operating button at one end thereof remote from the valve chamber. A counter stop is fixed to the housing and an end portion remote from the valve chamber to cooperate with an adjustable stop. A bush having an exterior thread is slidably and rotatably microscopically mounted on the outer surface of the cylinder. The bush carries the adjustable stop in threaded engagement while being coupled to the operating button in a axially fixed and freely rotatable manner. A connecting arrangement rotationally couples the button to the bush upon respective actuation of the connection arrangement so that the rotating button with rotate the bush and thereby axially displace to set the adjustable stop. A measuring system electronically monitors piston movement.

15 Claims, 3 Drawing Sheets

FLUID METERING APPARATUS FOR SUPPLYING FLUID OUT OF A STORAGE VESSEL TO A RECEIVER

BACKGROUND OF THE INVENTION

The invention relates to a dispenser or a metering apparatus, respectively, for precisely supplying fluid media out of a storage vessel to a receiver.

Such dispensers are used for precisely metering or dosing, respectively, fluid media as well as for titrating purposes. Said apparatuses can be used for metering greater volumes, such as liters, as well as for metering small volumes, such as microliters.

There exist already metering apparatuses comprising a metering piston pump having a glass cylinder. Said cylinder exhibits a graduation from which readings can be taken showing the volume of fluid medium taken out from the storage vessel. Normally a flask is used as such a storage vessel.

Metering apparatuses of the kind in re serve mainly the purpose of discharging or supplying, respectively, several times a constant and predetermined quantity of liquid. In order to achieve this goal the piston stroke and consequently the volume supplied during each metering action is adjusted to a certain height or amount, respectively. This is achieved for instance by providing for a length of stroke with the help of two stops, i.e. a fixed stop and an adjustable stop. By adjusting the adjustable stop also the stroke of the piston is limited and adjusted thereby.

Such a metering apparatus (also called batching device) is for instance described in the European patent application EU-A- 831 01699. The adjustable stop of this known metering apparatus can be rotated in the peripheral direction of said device in order to change the length of stroke. The counter stop consists of a stepped gauge. By rotating the adjustable stop the length of stroke can be changed.

Since a stepped gauge is used the length of stroke can be changed and adjusted in great steps only.

There are known furthermore metering apparatuses comprising an adjustable length of stroke, for instance from the German Laid-open Print DE-A- 35 34 550. The dispensed amount of fluid to be discharged or sucked in, respectively, is determined with a contact-free scanning measuring system.

The metering piston pump, the stop means, if present, for limiting the length of stroke of the piston as well as the measuring system, if present, of said known dispensing devices or measuring apparatuses, respectively, are either contained in a housing or made up in such a way that some of the elements mentioned are situated out of the housing of said apparatuses. Therefore, said known metering apparatuses are difficult to clean and are not designed in an ergonomical manner.

The underlying aim of the present invention is to provide a dispenser or a metering apparatus, respectively, of the kind in re the length of stroke of which (and therefore the stroke volume of the amount of liquid to be discharged) can be adjusted in a simple but very exact manner.

A further aim of the present invention is to provide a dispenser which can be used in a simple and effective manner.

These aims are achieved according to the present invention by a dispenser for precisely supplying fluid media from a storage vessel to a receiver comprising a cylinder being mounted in a fluid tight manner in a valve chamber which can be connected with the storage vessel and which contains a suction valve and a discharge valve; a piston which is slidably guided in the cylinder and which is connected integrally in rotation at its end opposite to the valve chamber (2) with an operating button; an adjustable stop for changing the length of stroke of the piston and a counter stop cooperating with the adjustable stop; said operating button being tightly fixed to an axially movable and rotatable threaded bush which is concentrically arranged with respect to the cylinder and runs around outside thereof, whereby the operating button is freely rotatable with respect to the threaded bush but can be connected integrally in rotation via a connecting element with said threaded bush which is equipped on its outer casing with an external thread, whereby said adjustable stop is a stop nut integrally in rotation and concentrically with respect to the threaded bush and where said stop nut is equipped at the inner casing of its inner bore hole with an inner thread cooperating with the outer thread of the threaded bush such that said stop nut is axially displaced if the threaded bush is rotated.

Consequently, the cylinder of the dispenser of the present invention is mounted in a fluid-tight manner in a valve chamber or valve block, respectively, which is known per se and which contains a suction valve and a discharge valve.

A piston is slidably guided in said cylinder. The piston is, after being introduced into the cylinder, longer than the cylinder and is connected integrally in rotation at its free end with the operation button. For cleaning purposes the piston can be taken out of the cylinder.

Said operating button is connected with a rotatable and axially movable threaded bush which is arranged concentrically with respect to the cylinder and encompasses the latter. The connection is such that the operating button can be freely rotated with respect to the threaded bush, but is fixed in axial direction. The operating button can be connected via a connecting element frictionally and therefore integrally in rotation to the threaded bush. Said connection integrally in rotation is, however, detachable.

The threaded bush extends preferably over the complete height of the cylinder. Preferably it extends beyond the cylinder and has the form of an extension being described later. The threaded bush is equipped on its outer casing with an outer flat which extends preferably about almost the complete height of the threaded bush.

The adjustable stop of the dispenser of the present invention is a stop nut which is arranged concentrically with respect to the threaded bush and which encircles the latter. The axial height of the stop nut makes out for instance 1/10 to ⅓ of the length of that region of the cylinder which extends beyond the valve chamber. The stop nut is equipped at the inner casing of its inner bore hole with an inner thread which cooperates with the outer thread on the threaded bush. Said stop nut is guided integrally in rotation and therefore does not rotate.

By rotating the threaded bush with the operating button which can be connected integrally in rotation therewith via a connecting element the stop nut is displaced in axial direction.

The stop nut is preferably with the complete inner surface of the inner bore hole in contact with the threaded bush so that no tilting of the system can take place when the stop nut is moved.

By upward repulling the operation button also the threaded bush and together therewith the stop nut is moved upwards and so far until the stop nut comes in contact with a counter stop which is mounted at the upper end of the dispenser of the present invention. The length of stroke is adjusted by the position of the stop nut with respect to the threaded bush. The further down the stop nut is located at the threaded bush, the greater the stroke is (and therefore also the volume of the liquid to be dispensed which is sucked in by the piston).

The outer thread of the thread bush is preferably a multiple thread in order to be able to exactly adjust the height of the stop nut with respect to the thread bush. Said thread can be a round thread or a tapered thread.

The thread is preferably made up in such a way that five rotations are sufficient in order to move the stop nut from its lower position to the upper position.

The frictional connection which is therefore integrally in rotation between the operating button which is normally free rotatable with respect to the threaded bush and the threaded bush is achieved by a connecting element which can be pressed on from the outside.

The guidance integrally in rotation of the stop nut can be a common guidance, for instance a projection which is guided in an axially extending groove or slot.

According to a preferred embodiment the dispenser of the present invention is equipped with a measuring system which indicates the present position of the stop nut. Preferably a measuring system is used which produces electronic impulses upon movement of the piston (this means that also the threaded bush and the stop nut is moved). Said measuring system also registers and processes said impulses. Said measuring system can be an analogue measuring system, for instance a capacitive measuring system. Preferably a digital measuring system which displays after evaluation in an evaluation circuit the determined result on a digital display unit is used.

The measuring system comprises preferably a glass scale stick which is equipped with a glass scale. Said glass scale stick is arranged parallel to the cylinder and the threaded bush and sidewards therefrom. Said stick extends through an opening in the stop nut. Said opening is preferably provided in an extension at the side of the stop nut. By said means it is ascertained that the stop nut cannot rotate. The glass scale is scanned by a sensor head as described later down.

The measuring system is preferably controlled by a microprocessor which makes it possible to calibrate the volume dispensed by an analytical balance. This makes it furthermore possible to apply a correction factor to the number of measured impulses and to thereby assign said number of measured impulses to the volume which has indeed been dispensed. Thereby it is assured that all mechanical deviations of the diameter of the piston and the cylinder are limited and therefore taken care of.

Said measuring system together with the possibility of mechanically adjusting the stop means make possible that the stop is adjusted in an indefinite variable and exact manner. Consequently the volume dispensed can be exactly defined.

Due to the fact that the glass scale stick extends through the above described opening in the stop nut said glass scale stick of the measuring system assures at the same time that the stop nut is not rotated when the thread bush is rotated. Said stop nut is rather held integrally in rotation.

In an ergonomically designed and easy to be used embodiment of the dispenser of the present invention the cylinder and the piston (they form together a metering piston pump), the stop means together with its parts and the measuring system are contained in a perpendicular housing having an at least approximately cylindrical shape.

The valve chamber is known per se and contains a suction valve and a discharge valve. Said valve chamber is located in the lower region of the housing and can be put on the storage vessel or can be screwed on said vessel.

The cylinder, the piston which can be displaced within said cylinder, the stop means comprising for instance the stop nut, the threaded bush and the counter-stop as well as the measuring system are located above the valve chamber in that region which extends axially upwards from said valve chamber.

The free end of the piston is connected integrally in rotation with an operating button forming the upper end of the dispenser of the present invention.

The functional parts or elements, respectively, which make possible that a certain and predetermined volume is dispensed and the part for limiting the stroke length of the piston as well as the elements for registering or measuring, respectively, the height of the piston and therefore the stroke volume form together a functional group which is located in the perpendicular cylindrical housing (hollow cylindrical casing).

The operating elements, the display unit, for instance a LED- or LCD-display, the power source and the discharge pipe are located in an extension at the side of the abovedescribed housing. Said extension can be for instance a sprout-like arm. According to a preferred embodiment said sprout arm has the shape of a flat and lying block of stone the longitudinal axis of which is slightly inclined downwards with respect to the horizontal line. The expression "lying" makes clear that one of the great side walls of the block of stone form the lower boundary of the sprout-like arm. The other side wall of the two great side walls of said block of stone forms the upper boundary.

The discharge pipe extends through the free end of the sprout-like arm and therefore through one of the front faces of the block of stone and projects therefrom. At the free end the discharge pipe is inclined downwards and is therefore arranged in a vertical manner. The region of said discharge pipe which is found outside of the sprout-like arm is preferably supported by a rigid protecting sleeve which can be made for instance out of suitable plastic or out of steel. The discharge pipe is thereby supported and stabilized so that splashing of the dispensed liquid at the end of the discharge pipe is avoided.

The display unit and the operating elements are located in the upper region of the sprout-like arm. Due to this ergonomical arrangement they can be easily observed and manipulated, for instance by an upright standing person.

The housing is preferably composed of segments which can be put together. The lower segment surrounds the valve chamber, extends on the side which faces away from the sprout-like arm up to the lower region of the cylinder and surrounds also the lower region of the sprout-like arm and of the protecting sleeve of the discharge pipe.

The upper segment is the upper part of the hollow cylinder of the housing and surrounds the upper regions of the cylinder and of the threaded bush and surrounds also the connecting element for the operating button as well as for the threaded bush.

In the side wall of said upper segment facing towards the sprout-like arm an opening is found in which the operating knob is located. By pressing on said operating knob the connecting element is pressed in a frictional manner against the operating button (in particular against a flange extending downwards from the upper region of the operating button) as well as against the upper end of the threaded bush.

The third segment of the housing forms the upper cover wall of the sprout-like arm having the form of a block of stone and extends from the lower end of the upper segment up to the end of the sprout-like arm and also beyond said arm so that the third segment forms also a part of the protecting sleeve for the discharge pipe. Said third segment exhibits several openings in which a display or display unit, respectively, and operating buttons are put.

The invention is now demonstrated further on the basis of the figures which show a preferred embodiment of the dispenser of the present invention.

DESCRIPTION OF THE PREFERRED EMBODIMENTS

Figure 1:
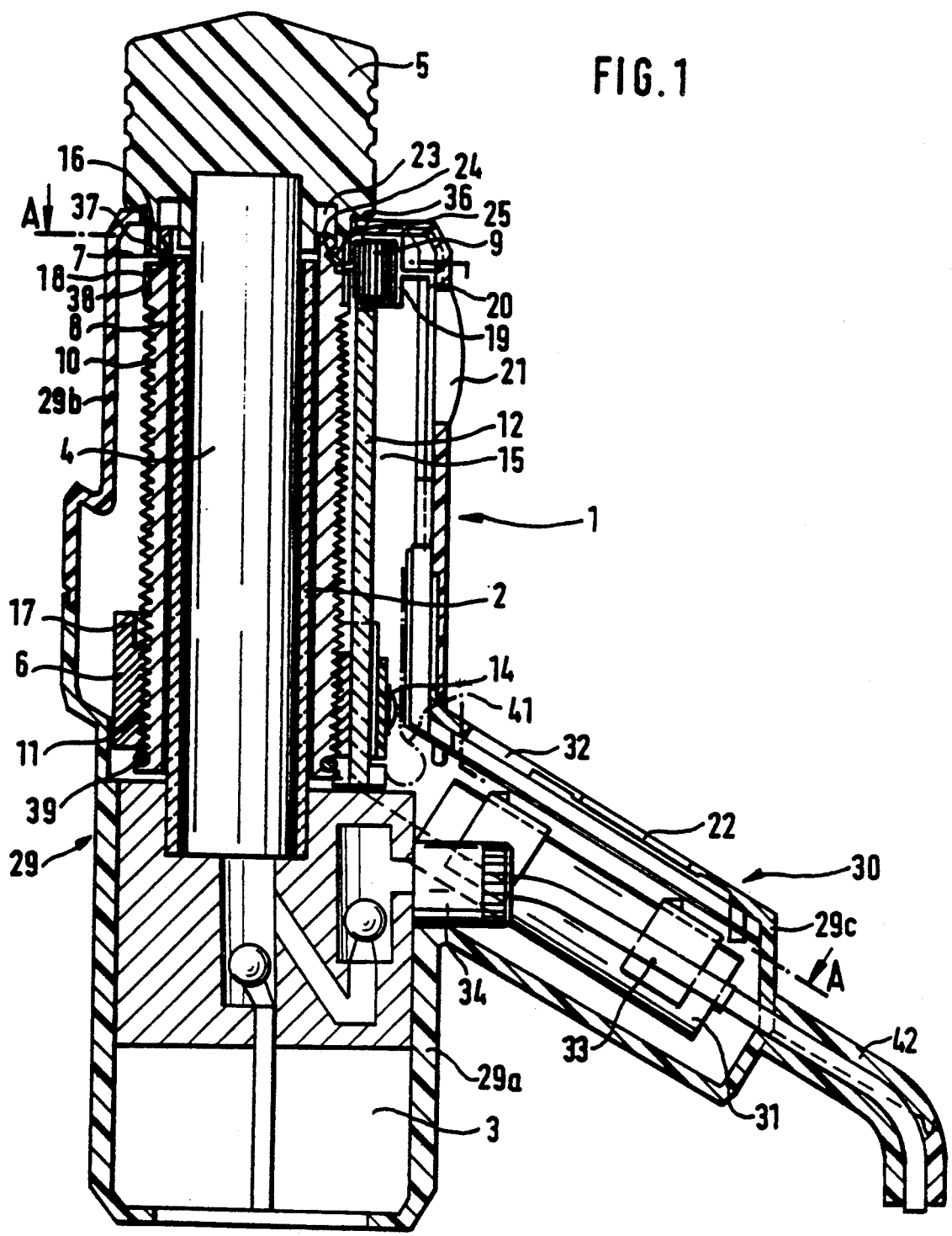
FIG. 1 is an axial sectional view through a dispenser of the present invention.

The dispenser 1 of the present invention as shown in FIG. 1 is equipped with a valve chamber 3 which is put on a storage vessel, for instance a flask which is not shown in the drawing. The valve chamber 3 is known per se and contains a suction valve and a discharge valve. Said valves normally contain ruby balls upon which gravity acts. The valve chamber is preferably made out of PTFE.

A connecting piece 34 extends sidewards from the upper region of the valve chamber. The discharge pipe 33 extends through said connecting piece.

The lower end of a cylinder 2 made out of glass is introduced in the upper part of the valve chamber 3 in a fluid-tight manner. The cylinder 2 contains a piston 4 which is movable with respect to said cylinder 2 and, after being completely introduced in said cylinder, extends beyond the free end of said cylinder 2. The core of the piston 4 consists of a tube made of glass, ceramic or metal. Both ends of said tube are open. A sleeve being one integral piece out of polytetrafluoroethylene is disposed on said core. At least the lower end of said sleeve is closed.

An operating button 5 is placed on the upper end of the piston 4 and is firmly connected therewith. By pulling up the operating button 5 also the piston is pulled up whereby liquid is sucked from the storage vessel into the cylinder 2. Upon pressing down of the operating button 5 the liquid sucked in is pressed through the discharge valve into the discharge pipe and from there into the receiver.

The operating button has about the form of a cylinder. Its outer diameter decreases in its lower region under forming a circular shoulder 36 which abuts against an abutment at the upper end of the housing 29 when the piston 4 is pressed down and when said piston 4 has reached or has almost reached its lower dead point. Said shoulder 36 and the abutment are formed in such a way that the friction is minimized when the operating button 5 is rotated.

The operating button is equipped with a flange 16 which is arranged concentrically with respect to the piston 4 and which surrounds the piston 4 in a certain distance. The flange 16 is equipped on its outer casing surface with an axially extending indentation 37 (or toothing, respectively).

Almost the complete region of the cylinder 2 lying outside of the valve chamber 3 is surrounded by a threaded bush 8 which is arranged concentrically with respect to said cylinder 2 and which surrounds said cylinder in such a manner that it can be rotated and axially moved. In case the piston is completely introduced into the cylinder 2 then the threaded bush 8 extends at its upper end beyond the cylinder 2 and at its lower end almost down to the valve chamber 3.

The threaded bush 8 is equipped at its outer casing surface with an outer thread 10 which extends almost to both ends of the threaded bush. The threaded bush 8 is equipped at its upper end and on its outer casing surface with an identation 38 which corresponds to the identation 37 on the flange 16.

The outer diameter of the threaded bush 8 is reduced upwards from the identation 38. In other words, the threaded bush 8 forms at its upper end a cylindrical extension 18 which projects into an annular groove 23 or slot, respectively, provided in the operating button 5.

The cylindrical extension 18 is equipped at its radially outer side wall with a radially surrounding groove 24 which is V-shaped whereby the tip of the V-shape is inwardly directed. Several calotte-like projections 25 project into said groove 24. Said projections 25 are located on the side wall of the groove 23, project radially inwards and are distributed on the circumference. Said projections 25 project into the V-shaped groove 24 such that the operating button can be rotated frictionless or almost frictionless with respect to the threaded bush 8. Upon pulling the operating button 5 upwards the calotte-like projections 25 come, however, into contact against the upper and inclined side wall of the V-shaped groove. When coming in abutment against said upper side wall also the threaded bush 8 is pulled upwards.

It is also possible to replace the calotte-like projections by freely rotatable balls which are pressed by a spring in the V-shaped groove 24. This assures the free rotatability of the operating button 5 with respect to the threaded bush 8. The cylindrical extension 18 of this embodiment is preferably extending further down in the operating button 5 (not shown in FIG. 1), so that said extension 18 extends beyond the piston 4 (the groove 23 has then to be deeper). The V-shaped groove of this embodiment is preferably located on the radially inwards lying side wall of the cylindrical extension 18. The balls are then pushed by the spring mentioned above from radially inwards to radially outwards in said V-shaped groove.

The operating button 5 and the threaded bush 8 have such a form that the flange 16 and the end of the threaded bush 8 carrying the identation 38 are as closely adjacent as possible without coming in direct contact with each other.

The frictional connection and therefore the connection integrally in rotation between the operating button 5 and the threaded bush 8 is assured by a toothed cylinder 9 which is arranged axially parallel to the piston 4 and sidewards of the operating button 5 or the threaded bush 8, respectively. Said cylinder 9 is arranged in such a manner that it can be pressed at the same time against the indentation 37 (or toothing, respectively) on the flange 16 as well as against the indentation 38 (or toothing, respectively) on the upper end of the threaded bush 8. In case the cylinder is pressed onto the indentations 37 and 38 the threaded bush 8 and the operating button 5 rotate together with each other.

The cylinder 9 is rotatably mounted at both its front faces by a fork 19 which is attached via a lever 20 to the housing 29. The lever 20 is made of an elastic material which is fixed at its end opposite to the fork 19 at the housing 29 so that said cylinder 9 can act as spring. By pressing the knob 21, which is connected with the lever 20, the cylinder 9 is pressed by overcoming the counteracting force of the spring on the indentations 37 and 38. In case the operating knob 21 is not pressed down also said cylinder 9 is not pressed against said indentations 37 and 38 so that the threaded bush 8 cannot be accidentally rotated.

It is also possible to replace the cylinder 9 by a friction wheel or by a similar device.

Figure 2:
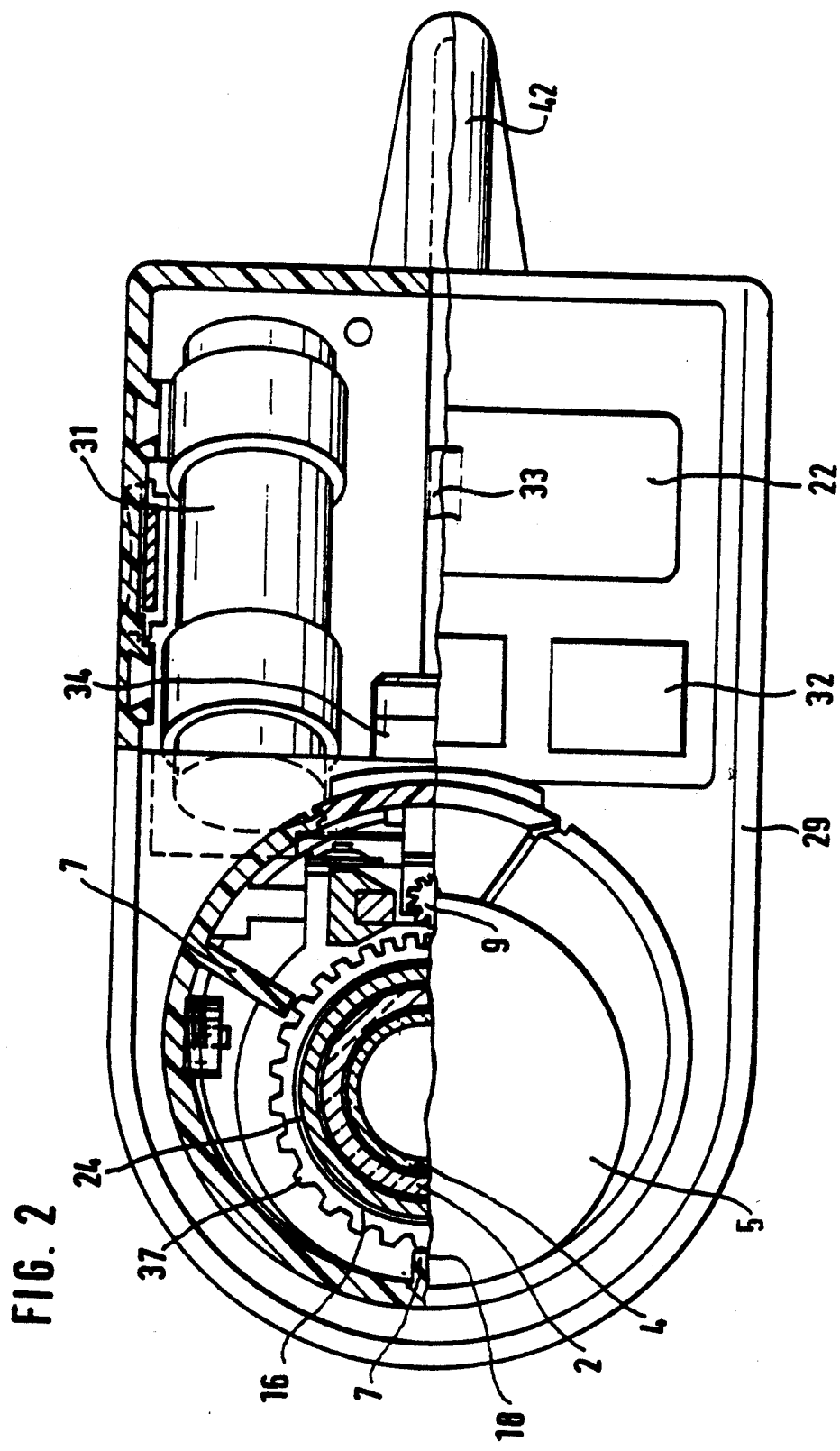
FIG. 2 is a partial sectional view along the line A—A in FIG. 1 and a plane view from above on the dispenser of the present invention.
Figure 3:
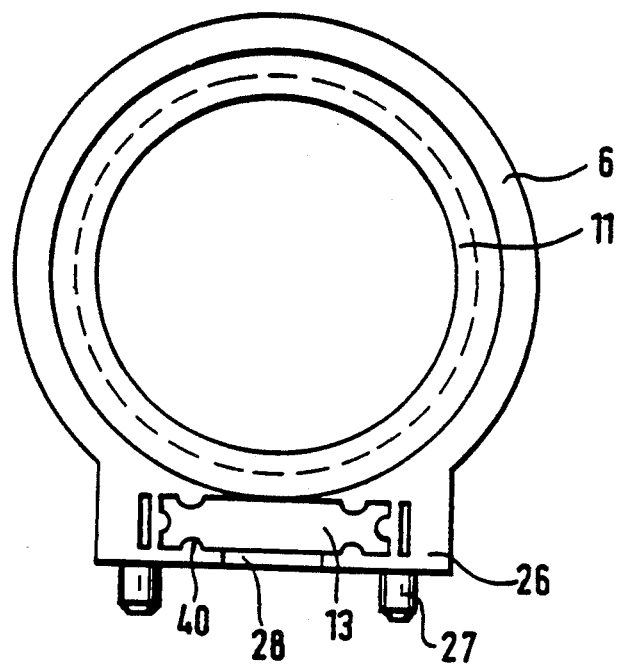
FIG. 3 is a cross-sectional view through the stop nut.

The adjustable stop of the dispenser of the present invention consists of a stop nut 6 which is arranged concentrically with respect to the threaded bush 8 and which surrounds the latter. The inner wall of the inner bore hole of the stop nut 6 is equipped with an inner thread 11 (see also FIG. 3) which cooperates with the outer thread 10. The stop nut 6 is guided in such a way that it cannot perform a rotational movement. It is axially displaced by rotating the threaded bush 8. In order to rotate the threaded bush 8 the user presses on the above described operating knob 21 and rotates then the operating button 5. Due to the fact that the outer thread/inner thread 10/11 are multiple threads the height of the stop nut 6 with respect to the threaded bush 8 can be exactly adjusted. The higher the stop nut 6 is "adjusted" with respect to the threaded bush 8 the lower the possible length of stroke is when the piston 4 is pulled outwards. This is due to the following fact. The higher the stop nut 6 is located on the threaded bush 8, the earlier said stop nut 6 bush 8 abuts against the counter stop 7 (compare also FIG. 2). The stop nut 6 is equipped with a radially surrounding O-ring 39 in order to prevent that the stop nut 6 is moved too much downwardly.

The upper region of the stop nut 6 is not equipped with an inner thread but forms a ring cylinder which is not in contact with the threaded bush 8. The upper circular face comes in abutment against the counter stop 7 if the stop nut 6 is moved in its upper position.

The cylindrical stop nut 6 is equipped with a lateral extension 26 having an axial opening 13 with a rectangular cross-section. Laterally from the extension 26 there are provided two nipples 27. A sensor head 14 can be attached with the help of said nipples.

A glass scale stick 12 extends through the opening 13 and in a parallel manner to the threaded bush 8. The axial length of said glass scale stick 12 corresponds about to the axial length of the outer thread 10 on the threaded bush 8. A twisting of the stop nut 6 is prevented by said glass scale stick. The cross-section of the glass scale stick 12 corresponds about to that one of the opening 13 and is chosen such that the axial displacement of the stop nut 6 is not hindered. For this purpose axially arranged guiding ribs 40 are provided on the inner walls of the opening 13. Corresponding guiding grooves are provided on the glass scale stick (not shown in the Figures).

The glass scale on the glass scale stick 12 is scanned in a contact-free manner by the sensor head 14 through the window 28 which is directed to the opening 13. The sensor head 14 is equipped with a scanning element having a nonius, an emitter and a receiver. In order to determine the vertical lift and therefore the length of stroke and also the stroke volume the sensor head scans the graduation on the glass scale of the glass scale stick by employing the principal of a light barrier.

The dispenser 1 of the present invention makes it therefore possible to adjust the height of the stop 6 in an infinitely variable manner.

The evaluation circuit which is for instance a microprocessor and which cooperates with the sensor head is designed such that the present position of the stop is displayed at any time and that the amount of liquid sucked in or the amount of liquid already dispensed is displayed during the dispensing process.

The sensor head 14 is electrically connected via a flat cable 41 with operating elements 32 and with a digital display unit 22.

The display unit 22 and the operating elements 32 are located on the upper side, of the spout-like arm 30 which has the shape of a parallelpiped which is slightly inclined downwards with respect to the horizontal line. Also batteries 31 are located in said spout-like arm 30.

The discharge pipe 33 extends through the spout-like arm 30 as well and is guided outside of said spout-like arm in a rigid protecting sleeve 42.

The housing 29 of the dispenser of the present invention consists of three housing segments 29a, 29b, 29c. The lower housing segment 29a surrounds the valve chamber 3 and extends on the end facing away from the spout-like arm 30 beyond the valve chamber 3. The lower region of the spout-like arm 30 as well as of the protecting sleeve 42 are integrally formed onto the region which surrounds the valve chamber 3.

The upper housing segment 29b surrounds the upper region of the cylinder 2, the glass scale stick 12 and the cylinder 9. The counter stop 7 is integrally formed onto the upper region of said housing segment 29b. There are present altogether three counter stops 7 which extend from the inner wall of the housing segment 29b radially inwards almost up to the flange 16. Said counter stops 7 have the shape of a bar.

The housing segment 29c possesses at its upper end an opening of such a size that the threaded bush 8 can be pulled out until the stop nut 6 abuts against the counter stop 7. The housing segment 29c extends from the lower end of the housing segment 29b up to the front face of the flat block of stone and also beyond thereof, so that the upper part of the protecting sleeve 42 is made out of this housing segment 29c.

Due to the fact that the housing consists of segments it can be easily taken apart and cleaned or sterilized. It is also possible to pull out the operating button 5 together with the piston 4. Due to the above-described connection between the flange 16 with the cylindrical extension 18 of the threaded bush 8 by employing the calotte-like projections 25 it is possible to separate the operating button 5 from the threaded bush 8. Thereafter the upper housing segment 29b and also the housing

We claim:

1. A dispenser for precisely dispensing a predetermined volume of fluid from storage vessel into a recipient vessel, said dispenser comprising:
   a housing (29) formed with a connector portion (29a) having valve chamber with a suction valve and a discharge valve therein;
   a cylinder (2) mounted on the connector portion of said housing (29) and connected in a fluid tight manner to said valve chamber, which valve chamber is connected in a fluid tight manner to both the suction valve and the discharged valve;
   a movable piston (4) in the cylinder and carrying an operating button (5) fixed on its end remote from the valve chamber;
   a bush (8) threaded on its outer surface and slidably and rotatably mounted in a telescopic manner on the outer surface of the cylinder (2), said bush carrying an adjustable stop (6) in threaded engagement therewith, means far coupling the bush to the button (5) in an axially fixed and freely rotatable manner on the end of the bush remote from the valve chamber;
   a counter stop (7) fixed to the housing at an end portion remote from the valve chamber to provide an abutment for the adjustable stop; and
   connecting means for rotationally coupling the button to the bush upon respective actuation of the connecting means, so that rotatinq the button (5) will rotate the bush (8) and thus axially displace the adjustable stop (6).

2. A dispenser according to claim 1, further comprising a measuring system means for indicating a position of the adjustable stop.

3. A dispenser according to claim 2, wherein the measuring system means produces and registers electronic impulses upon movement of the piston and displays said impulses on a digital display unit.

4. A dispenser according to claim 3, wherein the measuring system means comprises a glass stick having a scale, said glass stick being arranged parallel to the cylinder and the threaded bush to extend through an opening in the adjustable stop, and a sensor head spaced from said glass stick for scanning of the scale on the glass stick, and said sensor head is fixed on the adjustable stop.

5. A dispenser according to claim 4, wherein the opening is located in a lateral extension at the side of the adjustable stop and has a generally rectangular cross-section, one of the longer sides of the rectangular cross-section opening being arranged tangentially with respect to the thread of the bush.

6. A dispenser according to claim 5, wherein the lateral extension includes at least one nipple for securing the sensor head, said extension being equipped in an outer wall thereof with a window facing the opening.

7. A dispenser according to claim 1, wherein the connecting means is actuated by being pushed radially inward by application of a radial force, against the outwardly directed force of a spring in said connecting means into contact with both the operating button and the threaded bush to provide a frictional coupling connection.

8. A dispenser according to claim 7, wherein the operating button is equipped at a side thereof facing the valve chamber with a cylindrical flange being arranged concentrically with respect to the piston and being equipped at its outer casing surface with an axially arranged indentation, wherein the threaded bush at the end axially adjacent the flange has the same outer diameter as the flange and possesses at its outer casing surfaces an axially arranged indentation also and wherein the connecting means is a toothed cylinder having an axially arranged indentation, the longitudinal axis of said toothed cylinder being arranged axially parallel to the piston and being mounted rotatably around said longitudinal axis.

9. A dispenser according to claim 8, wherein the toothed cylinder is rotatably mounted at both of its front faces to a fork which is connected via a radially movable lever to an operating knob.

10. A dispenser according to claim 1, wherein the threaded bush is equipped at its end facing the operating button with a cylindrical extension having the same inner diameter but a smaller outer diameter whereby said extension projects into an annular groove provided in the operating button and is tightly connected in an axial direction, partly through said extension, to the threaded bush and whereby said extension is rotatable with respect to the operating button.

11. A dispenser according to claim 10, wherein the cylindrical extension is equipped with a radially circling V-shaped groove, into which calotte-like projections project which are distributed along the circumference and are located facing the groove on one of the radially outwards lying or the radially inwards lying side walls of the groove of the operating button.

12. A dispenser for precisely dispensing fluid media from a storage vessel into a receiver, comprising a housing having a valve chamber with a suction valve and a discharge valve therein; a cylinder mounted in a fluid-tight manner in the valve chamber, said valve chamber being connectable with the storage vessel; a movable piston slidably guided in the cylinder and connected with an operating button, adjustable stop means within said housing and being adjustable in its position within the housing and operatively connected to the piston for changing the length of stroke of the piston, and a counter-stop cooperating with the adjustable stop means to provide an abutment for the adjustable stop means when moved; a measuring system means connected to the adjustable stop means for registering movement of the piston, operating elements for operating the measuring system and a display unit for measuring the output of the measuring system, wherein the cylinder, the piston, the adjustable stop means and the counter-stop and the measuring system are located in the housing; and
   a spout-like arm attached to the side of the housing, said display unit and said operating elements being located within said spout-like arm and wherein a discharge pipe from said discharge value extends through said spout-like arm and projects therefrom.

13. A dispenser according to claim 12, wherein the spout-like arm generally has the shape of a parallelpiped which is inclined with respect to the longitudinal axis of the housing towards the valve chamber.

14. A dispenser according to claim 12, wherein the operating elements and the display unit are arranged on a side of the spout-like arm facing away from the valve chamber and wherein the spout-like arm contains a power source for the measuring system.

15. A dispenser according to claim 12, wherein the discharge pipe outside of the spout-like arm is supported by a rigid and adjacent protective sleeve, said discharge pipe being inclined at its free end such that it runs parallel to the housing.

* * * * *